Figure 1:
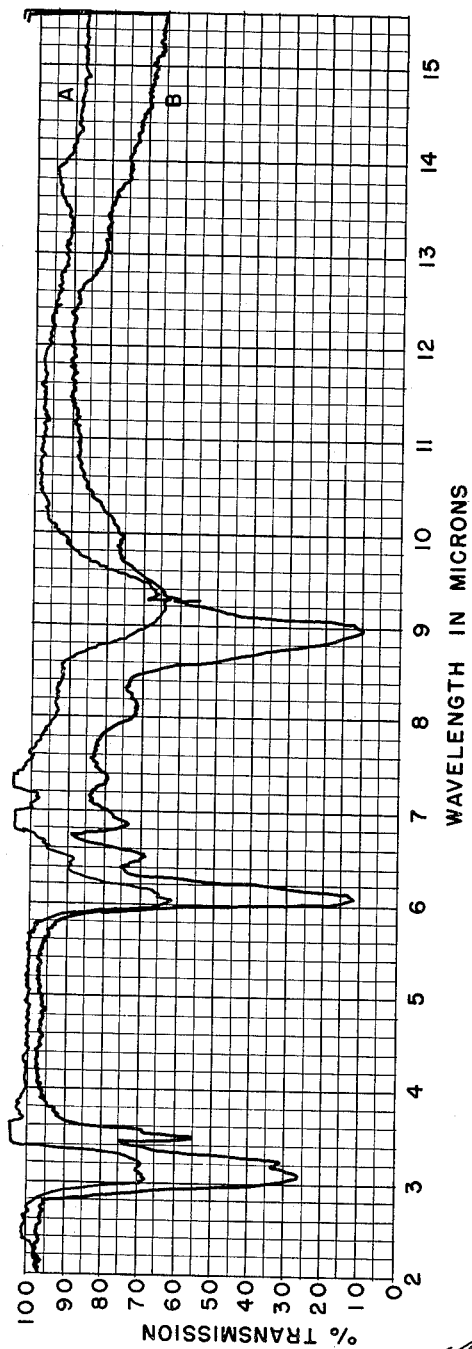

Aug. 29, 1961 J. CHARNEY ET AL 2,998,438
EULICIN AND PROCESS FOR PRODUCTION
Filed March 31, 1958 2 Sheets-Sheet 1

2,998,438
EULICIN AND PROCESS FOR PRODUCTION

Jesse Charney, Alfred A. Tytell, and William P. MacClure Fisher, Lansdale, Pa., assignors to Merck & Co., Inc., Rahway, N.J., a corporation of New Jersey
Filed Mar. 31, 1958, Ser. No. 725,442
1 Claim. (Cl. 260—404.5)

This invention relates to a new and useful antibiotic which we have discovered and named eulicin, and with the production of this antibiotic. The antibiotic has the chemical structure:

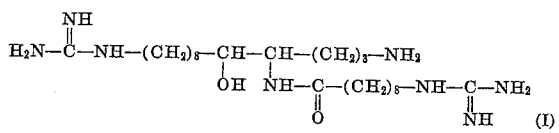

This application is a continuation in part of our earlier filed application Ser. No. 543,755, filed on October 31, 1955.

The new antibiotic, eulicin, is effective in inhibiting the growth of fungi which are pathogenic to man, animals and plants, and which are of industrial significance in that they grow in or on edibles such as meat, cheese and bread rendering them unacceptable for use, and on leather, textile materials, paper, and the like, causing them to deteriorate.

Eulicin has been found to be particularly effective in inhibiting the growth of the systemic fungi *Blastomyces dermatitidis, Monosporium apiospermum, Histoplasma capsulatum, Cladosporium wernecki* and *Cryptococcus neoformans*; the plant pathogen *Alternaria solanium*; and is especially effective in inhibiting the growth of *Aspergillus niger* which causes considerable industrial waste and/or deterioration in food, leather, textile, paper, paint and allied industries by destroying or spoiling the products through fungus contamination.

Eulicin has also been found to inhibit the growth of some bacteria and is particularly effective in inhibiting the growth of *Mycobacterium tuberculosis*.

The inhibitory concentrations of eulicin against a number of fungi are given in the following Table I and against bacteria in Table II.

The in vitro activity of eulicin against various fungi was determined by a broth dilution method using twofold dilutions. Previously inoculated medium was added to aqueous dilutions of eulicin. The minimal inhibitory concentration was defined as the amount per milliliter in the highest dilution showing no visible growth. All tests were incubated at room temperature and the incubation period varied with the time required for growth. However, all cultures were incubated beyond the time necessary to permit complete growth of the controls.

For the in vivo experiments, female Swiss albino mice weighing 14–16 grams were infected intraperitoneally with a mucin suspension of a yeast-phase culture of *Blastomyces dermatitidis*. Graded intraperitoneal, intramuscular or oral treatment was begun at the time of infection and continued once daily for ten doses over a twelve-day period. Treatment was omitted on the sixth and seventh days. After twenty-eight days, calculations were made by the method of Reed and Muench to determine the amount of eulicin per dose per mouse required to protect 50% of the mice ($PD_{50}$).

The activity of eulicin against the bacteria in Table II was determined by growing the test organism with varying amounts of the antibiotic in nutrient broth at 37° C. The incubation period varied with the time required for growth. The activity of eulicin against *M. tuberculosis* was determined by substantially the same method using Dubos medium.

TABLE I

*Antifungal activity*

| Organism: | In vitro mcg./ml. to inhibit growth |
|---|---|
| *Aspergillus niger* | 0.0053 |
| *M. Apiospermum* | 0.037 |
| *Histoplasma capsulatum* | 0.074 |
| *C. wernecki* | 0.074 |
| *C. neoformans* | 0.074 |
| *Hormodendrum pedrosoi compactum* | {0.14 / 0.28} |
| *Phialophora verrucosa* | 0.28 |
| *Blastomyces blasiliensis* | 0.59 |
| *Nocardia asteroides* | 2.3 |
| *Epidermophyton floccosum* | 1.2 |
| *Trichophyton mentagrophytes 17* | 2.3 |
| *Microsporum gypseum* | 9.5 |
| *Alternaria solanium* | <0.074 |

THE PROTECTIVE AND TOXIC DOSE OF EULICIN FOR MICE INFECTED WITH *BLASTOMYCES DERMATITIDIS*, UTAH (10 DOSE—12 DAY TREATMENT)

|  | Route of administration | | |
|---|---|---|---|
|  | I.P.[1] | I.M.[2] | Oral |
| $PD_{50}$[3] | 0.61 | 6.3 | 430 |
| $TD_{50}$[3] | 130.0 | 153.0 | >767 |

[1] Intraperitoneal.
[2] Intramuscular.
[3] Dosage expressed in mcg./dose/mouse: $PD_{50}$ means average protective dose; $TD_{50}$ means average toxic dose.

TABLE II

*Antibacterial activity*

| Organism: | In vitro mcg./ml. to inhibit growth |
|---|---|
| *M. tuberculosis* H37Rv | 0.70 |
| *Bacillus subtilis* 6633 | 8.7 |
| *Staphylococcus aureus* No. 209 | 17.4 |
| *Mycobacterium* No. 607 | 8.7 |

The above data show that eulicin usefully inhibits the growth of a large variety of fungi pathogenic to human beings, animals and plants and that it is a useful preservative for articles of commerce.

Eulicin, advantageously in the form of its non-toxic, soluble salts, can be incorporated in various food products in aqueous solution, the amount of antibiotic being adequate to bring the final concentration to the desired level. Concentrations of eulicin as low as 12 micrograms per gram of foodstuff have shown a preservative effect in such comestibles as bouillon, fruit preserves and baked goods.

Eulicin is formed during the cultivation under controlled conditions of a microorganism isolated from a soil sample obtained from Jackson Heights, New York which is, or is related to the previously described *Streptomyces parvus*. A culture of the living organism has been deposited with the American Type Culture Collection, 2029 M Street, N.W., Washington 6, D.C., and has been added to their collection of microorganisms as ATCC–12320. The identification of the producing organism has been established by the following determination of its characteristics:

TABLE III

*Classification of eulicin-producing organism*

| Medium | Amount of growth | Color | | Remarks |
|---|---|---|---|---|
| | | *Aerial mycelium* or spores | Soluble pigment | |
| Litmus milk | Moderate | White | | 2 days at 37° and 30°: partial peptonization; wrinkled, brown collar adhering to glass.<br>3 days: white surface spores.<br>15 days at 30°: dark brown wrinkled collar: complete peptonization without a clot; clear blue liquid.<br>15 days at 37°: partial peptonization.<br>15 days: medium is alkaline. |
| Nitrate broth | do | White, sparse at 37° | Brown | 2 days: floccular, brown bottom growth.<br>4 days: white spores covering entire surface at 30°. Sparse spores at 37°.<br>11 days: Nitrate reduced to nitrite. |
| Tryptone broth | do | 30°—white turning gray with age<br>37°—none | Brown—darker at 30° | 2 days: floccular, brown growth at bottom of tubes at 37° and 30°.<br>9 days: wrinkled white collar becoming gray at 30°. |
| Czapek's broth | do | 30°—white | None | 2 days: floccular, brown bottom growth at 37° and 30°.<br>7 days: white spores at 30°. |
| Gelatin stab | do | None | Brown | 2 days: tan surface growth.<br>3 days: floccular, brown bottom growth. Gelatin completely liquified at 30° and 37°. |
| Indole-nitrite | do | do | do | 2 days: tan surface growth adhering to glass; small balls of growth extending half-way down tube.<br>4 days: wrinkled tan collar; balls of growth ¾ down tube. |
| Potato plug | do | Sparse gray | Dark brown becoming almost black. | 2 days: shiny tan balls of growth covering surface of plug.<br>15 days: sparse gray spores. |
| Starch agar | do | Sparse white | Brown; darker at 30° | 1 day: shiny brown, pasty colony; pebbly surface.<br>2 days: undulate edge, pasty colony.<br>3 days: white edge, shiny brown center. Reverse—mustard brown.<br>15 days at 30°: No hydrolysis of starch.<br>15 days at 37°: very slight hydrolysis of starch. |
| Bennett's agar | Excellent | White becoming yellowish-white | Orange-brown becoming dark brown. | 1 day: cream-colored, pebbly surfaced colony.<br>2 days at 37°: cream-colored; wrinkled raised surface, erose edge. Reverse—yellowish tan becoming brown.<br>2 days at 30°: chalky-white, raised, wrinkled surface, undulate edge. Reverse—light brown becoming dark brown, almost black.<br>9 days at 37°: gray-white spores, raised wrinkled surface.<br>9 days at 30°: yellowish-white chalky surface; yellow exudate on surface. |
| Glucose-peptone agar | Moderate | 30°—white becoming yellowish-white<br>37°—sparse white | Yellowish-brown | 2 days: 37°—tan colony, wrinkled surface; pasty, crenate edge. 30°—yellowish white, raised, wrinkled surface; undulate edge. Reverse: 37°—orange-brown; 30°—light brown. |
| Meat Peptone agar | do | White | Orange-brown darker at 30°. | 1 day: pasty brown, pebbly surface colony.<br>2 days: brown, raised, wrinkled center, white spores at edge, crenate edge. Reverse: orange-brown becoming dark brown. |
| Glucose asparagine agar | do | 30°—white becoming yellowish-white<br>37°—white | 30°—faint yellow | 1 day: light tan colony.<br>2 days: crenate edge, chalky white raised, wrinkled surface.<br>9 days at 30°: crenate edge, powdery yellowish-white spores covering surface. Reverse: 37°—gray-brown; 30°—yellowish-brown. |
| Sodium caseinate agar | do | 30°—white becoming yellowish-white<br>37°—white becoming gray-white | Yellowish-brown darker at 30°. | 1 day: light brown colony.<br>7 days at 37°: gray-white center, undulate edge; waxy, smooth brown edge;<br>7 days at 30°: yellowish-white spores covering surface, powdery; narrow brown smooth undulate edge. Reverse: 37°—light brown becoming darker; 30°—yellowish-brown becoming darker. Hydrolysis—1 day: 37°—5 mm. from edge of 13 mm. colony; 30°—8 mm. from edge of 13 mm colony. |
| Czapek's agar | do | White becoming yellowish-white | | 1 day: light brown, rough surfaced colony.<br>2 days: white spores at 30° edge; erose, powdery.<br>3 days: white spores at 30° and 37°; brown center.<br>7 days at 37°: brown center, white edge.<br>7 days at 30°: yellowish-white spores covering surface. Reverse: 37°—gray-white; 30°—yellowish-white. |
| Tyrosine agar | Poor | None | None | Erose edge, pasty, light brown colony; poor growth. Reverse: gray-tan. |

See notes at end of table.

Table III—Continued

| Medium | Amount of growth | Color | | Remarks |
|---|---|---|---|---|
| | | Aerial mycelium or spores | Soluble pigment | |
| Calcium malate agar | ___do___ | 30°—sparse white becoming yellow-white. | 30°—yellow becoming bright yellow with age. | 1 day: shiny brown colony, rough surface. 2 days: glistening brown center, white edge at 30°. 10 days: 30°—brown center, powdery, yellow-white edge; 37°—no spores. |
| Synthetic agar with cellulose as source of carbon. | None | | | |
| Sodium caseinate agar tube inoculated throughout. | Moderate | White becoming yellowish-white | 30°—yellow. 37°—yellowish-brown. | 1 day: brown surface growth, yellow ring at surface which sporulated in 2 days. 3 days: casein completely hydrolyzed. |

The organism is aerobic—optimum temperature is 30°. Acid is produced in maltose, lactose, mannose and xylose medium.
Microscopic: Modified Henrici mount and Scotch tape contact method—branched mycelium measured approximately 1.0 m$\mu$ in diameter. Aerial mycelia gave rise to oval conidia in long chains which measured approximately 0.8 mu in diameter and 1.1 m$\mu$ in length.
Characteristics of this organism as described above are very similar to, or identical with, the description of Streptomyces parvus, as reported in Bergey's Manual of Determinative Bacteriology, sixth edition, p. 939.

The fermentation procedure for the production of this antibiotic is conducted in substantially the same manner as for other antibiotics and makes use of ingredients which are known sources for carbon, nitrogen, inorganic salts and trace minerals. Examples of fermentation media in which eulicin is usefully produced are as follows:

Medium I-A

| | Percent of ingredient in total composition |
|---|---|
| Cerelose (dextrose hydrate) | 0.8 |
| Monosodium glutamate | 0.125 |
| NaCl | 0.083 |
| $K_2HPO_4$ | 0.241 |
| $KH_2PO_4$ | 0.2 |
| $MnCl_2$ | 0.0002 |
| Basaminbact (yeast extract) | 0.1 |
| Tryptone | 0.28 |
| Phytone | 0.05 |

Tap water to 100%, pH adjusted to 6.8.

Medium I-B

| | |
|---|---|
| Corn Products dextrine No. 167 (starch gum) | 3.0 |
| Hiram Walker Stimuflav (distillers solubles) | 1.5 |
| $(NH_4)_2HPO_4$ | 0.5 |
| NaCl | 0.5 |
| $K_2HPO_4$ | 0.12 |
| $KH_2PO_4$ | 0.1 |
| $MgSO_4 \cdot 7H_2O$ | 0.01 |
| $FeSO_4 \cdot 7H_2O$ | 0.002 |
| $ZnSO_4 \cdot 7H_2O$ | 0.001 |
| $MnSO_4$ | 0.0002 |

Tap water to 100%, pH adjusted to 6.8.

| | |
|---|---|
| $CaCO_3$ (sterilized separately) | 0.15 |

Medium II: Medium I-A and B but replacing the tryptone and phytone employed in I-A with 0.28% Sheffield NZ amine B (enzymatic digest of casein) and 0.05% Sheffield soy peptone (papain digest of soy bean).

Medium III:

| | Percent of ingredient in total composition |
|---|---|
| Glucose | 1.0 |
| $(NH_4)_2HPO_4$ | 0.4 |
| NaCl | 0.5 |
| $K_2HPO_4$ | 0.2 |
| $MgSO_4 \cdot 7H_2O$ | 0.01 |
| $FeSO_4 \cdot 7H_2O$ | 0.002 |
| $ZnSO_4 \cdot 7H_2O$ | 0.001 |
| $MnCl_2$ | 0.0002 |

Tap water to 100%, pH adjusted to 6.8.

| | |
|---|---|
| $CaCO_2$ | 0.35 |

Medium IV: Medium III but substituting for the glucose, 1% Corn Products dextrine 167 and adding 1% brewer's yeast No. 3, Yeast Products, Inc. (YPI).
Medium V: Medium III but substituting for the glucose, 3% Corn Products dextrin 167 and adding 3% YPI brewer's yeast No. 5.
Medium VI: Medium III with 5% Corn Products dextrin 167 and 1% liquid yeast concentrate such as S-600, Yeast Products, Inc.
Medium VII: Medium III with 3% Corn Products dextrin 167 and 0.5% corn steep liquor, Corn Products.
Medium VIII: Medium III with 1% Corn Products dextrin 167 and 0.25% Brown and Forman's distiller's solubles.
Medium IX: Medium III with 3% Corn Products dextrin 167 and 0.5% Sheffield's soy peptone.
Medium X: Medium III with 5% Corn Products dextrin 167 and 1% Sheffield NZ amine B.
Medium XI: Medium III with 3% Corn Products dextrin 167 and 0.5% casein hydrolysate.
Medium XII: Medium III with 1% Corn Products dextrin 167 and 0.25% yeast hydrolysate.

Medium XIII:

| | Percent |
|---|---|
| Basaminbact (yeast extract) | 5.0 |
| Corn Products dextrin 167 | 5.0 |

Tap water to 100%, pH adjusted to 6.8.

The usual procedures are carried on for the growth of the microorganism. This involves aeration to supply large quantities of oxygen and agitation such as that due to stirring or shaking. The stock culture is first added to a small amount of the selected culture medium and shaken for several days at an ambient temperature on the order of 25° C. It is then divided up into several larger flasks containing the culture medium and growth is continued in each, after which successive similar subdivisions and seedings are carried on in larger containers. The final cultures are combined and from the filtrate obtained therefrom the antibiotic is isolated in purified form.

Larger quantities of the antibiotic can be prepared by growing the microorganism as described above and then transferring a portion of the culture medium and growth into tank fermenters containing a medium of the type described above as medium I-B. An antifoam agent is advantageously added and the medium agitated and aerated at a temperature of about 30° for several days.

Eulicin can be isolated from the fermentation broths by filtering or otherwise removing the mycelium and separating the antibiotic from the filtrate by adsorption on carbon, or on cationic resins and particularly on carboxylic resins such as IRC-50 or on Duolite S-30 [1] followed by acid elution. Elution, particularly from carbon, can be effected with acidified alcohol, for example methanolic-HCl, or with aqueous acid which is preferred when eulicin is eluted from the carboxylic resins. The antibiotic can also be isolated from the filtrate by direct pre- ---
[1] The Duolite S-30 resin referred to above is manufactured by the Chemical Process Co., Redwood City, California. This resin is a porous decolorizing resin containing phenolic polar substituents. The resin has a very low acidic dissociation constant and thus shows only slightly acidic properties. These substantially neutral porous decolorizing phenolic resinous adsorbents can be prepared in accordance with procedures set forth in U.S. Patent No. 2,389,865.

cipitation as an insoluble organic acid salt, e.g. as a picrate or helianthate.

Further purification can be effected by extraction of the insoluble organic acid salt of eulicin with an organic solvent.

Further purification can be effected by extraction of the insoluble organic acid salt of eulicin with an organic solvent, preferably methanol, followed by the addition of an inorganic acid and ether which precipitates the inorganic acid salt of eulicin. By stepwise adjustment of the pH of an aqueous extract of this salt to about 9.0, impurities are precipitated and removed, as by filtration. The filtrate then can be readjusted to about pH 7, the antibiotic adsorbed on carbon, a carboxylic resin or on Duolite S-30 and subsequently eluted as described above.

The rate of production of eulicin and the concentration of the antibiotic activity can be followed microbiologically using a filter paper disc diffusion method against organisms known to be susceptible to the antibiotic, for example, *Aspergillus niger*. Correlation can be carried out with a serial dilution determination using the same organism.

Alternatively the amount of Duolite S-30 can be so chosen to adsorb preferentially impurities, permitting the antibiotic to pass through into the effluent. Eulicin may be separared from eluates or effluents containing it by precipitation with methyl orange. The helianthate thus formed can be crystallized from aqueous alcohol solutions.

The invention is further illustrated by the following examples:

FERMENTATION OF EULICIN

Example I

A 250 ml. Erlenmeyer flask containing 50 ml. of culture medium I-A was sterilized at 121° C. for 15 minutes, cooled and inoculated from a soil stock culture of *S. parvus*. The soil stock was prepared by drying the culture on sterile soil containing 0.25% calcium carbonate, thus maintaining viability for prolonged periods. The inoculated flask was placed on a rotary shaker operating at 250 r.p.m. with an amplitude of two inches. The temperature was maintained at 25° C. The flask was incubated for four days after which 10 ml. was transferred into a 2 liter flask containing 400 ml. of the same culture medium. The culture was shaken for an additional two days at 25° C. 400 ml. from the 2 liter flask then was transferred to a 20 gallon fermenter containing 45 liters of the same culture medium. The culture was maintained at 28° C., agitation at 200 r.p.m., and aeration at one-quarter volume of sterile air per volume of culture medium per minute. At the end of 2 days, 20 liters from the 20 gallon fermenter were piped into a 200 gallon tank containing 600 liters of medium I-B. The culture was maintained at 28° C., agitation at 200 r.p.m., and aeration at one-quarter volume of sterile air per volume of culture medium per minute for from 5 to 6 days. Antifoam G.E. 5566 was added as needed during the 5-6 day period (a total of 1500 ml. were added in 3 portions). The whole culture was then removed from the fermenter, the broth adjusted to pH 3.5 with sulfuric acid and filtered. The filtered broth then was processed for the isolation of eulicin.

Example II

The procedure of Example I was carried out using culture medium II described above.

Example III

A 250 ml. Erlenmeyer flask containing 50 ml. of culture medium III was sterilized at 121° C. for 15 minutes, cooled and inoculated from a soil stock culture of *S. parvus*. The soil stock was prepared by drying the culture on sterile soil containing 0.25% calcium carbonate, thus maintaining viability for prolonged periods. The inoculated flask was placed on a rotary shaker operating at 250 r.p.m. with an amplitude of two inches. The temperature was maintained at 25° C. The flask was incubated for four days after which 5 ml. was transferred into each of several 250 ml. Erlenmeyer flasks containing the same culture medium. The culture was maintained for three weeks by successive transfers of 5 ml. every four days into 250 ml. Erlenmeyer flasks incubated under the above conditions. A 2 liter flask containing 400 ml. of the same culture medium was then inoculated with 10 ml. from one of the above smaller flasks. The larger flask was in turn incubated on a rotary shaker under the above conditions for three days. At the end of the incubation period the total culture in the flask was used to inoculate 45 liters of the same culture medium contained in a 20 gallon fermenter. The culture was maintained at 25° C., agitation at 125 r.p.m., and aeration at one-quarter volume of sterile air per volume of culture medium. At the end of four days the whole culture was removed from the fermenter, the broth adjusted to pH 3.5 with sulfuric acid and filtered. The filtered broth then was processed for the isolation of eulicin.

The procedure of Example III was carried out using culture media IV through XIII described above.

While the above fermentation media contained certain specific sources of carbon, nitrogen, inorganic salts and trace minerals, other ingredients known to be suitable sources of these elements can be substituted therefor. It has been found, however, that the incorporation of distiller's solubles into the fermentation medium markedly increases the yield of eulicin. While Hiram Walker's Stimuflav and Brown and Forman distiller's solubles have been incorporated in the media described above, other distiller's solubles also are useful for this purpose.

ISOLATION OF EULICIN

Example IV

Filtered broth, 1,400 ml., was stirred 10 minutes with ½% (w./v.) of Norit A, a decolorizing carbon made by the Pfanstiehl Chemical Co., Waukegan, Illinois, and filtered. The filtrate, which contained no activity, was discarded. The carbon bed was washed on the filter with 200 ml. of water followed by 400 ml. of 80% (v./v.) acetone. The carbon bed then was eluted with 200 ml. of methanol containing 1% (v./v.) concentrated hydrochloric acid. The methanol was removed from the eluate by evaporation in vacuo and replaced by water to a final volume of 130 ml. This solution of crude eulicin hydrochloride had microbiological activity indicating a retention of activity of approximately 83%.

Example V

Filtered broth, 17 liters, assaying 17.5 units/ml. [total, 297,000 units], was passed through a column containing 20 gms. of Duolite S-30, a synthetic resinous adsorbent made by the Chemical Process Company, Redwood City, California. The effluent, assaying 5.3 u./ml. [total, 90,000 units],[2] was discarded. The column was washed with 2 liters of water [no loss of activity] followed by 2 liters of 80% (v./v.) acetone [no loss of activity] 1.5 liters of methanol [no loss of activity]. The column then was eluted with 200 ml. of methanol containing 1% (v./v.) concentrated hydrochloric acid. The eluate assayed 1,430 u./ml. [286,000 total].[2] A saturated aqueous solution of picric acid, 200 ml., and 600 ml. of water were added with stirring to the 200 ml. of eluate and the resulting suspension of crude eulicin picrate was filtered; the filtrate assaying 3.3 u./ml. [total, 3,300 units] was discarded. The residue on the filter was dried in vacuo then dissolved in 50 ml. of methanol to which 1 ml. of concentrated hydrochloric acid and 250 ml. of diethyl ---
[2] The sum of the units in the effluent plus those in he eluate is greater than the starting material, probably as a result of the error inherent in microbiological assays.

ether were added. The mixture was shaken in a separatory funnel resulting in the precipitation of crude eulicin hydrochloride. This material was dried in vacuo and found to assay 1,840 u./mg.

Example VI

An aqueous solution (pH 7.5) of crude eulicin hydrochloride, 7,400 ml., obtained as in Example V, which assayed 6,630 u./ml. [total, $49 \times 10^6$ units] was passed through a column containing 74 gms. of IRC-50, a carboxylic acid ion exchange resin made by Rohm and Haas Company, Philadelphia, Pennsylvania, which had been buffered to pH 7.5 with sodium hydroxide solution. The effluent, assaying 458 u./ml. [total, $3.4 \times 10^6$ units], was discarded. The resin was washed with 2 liters of water and then eluted with 2 liters of 1 normal hydrochloric acid. The eluate was passed through a column containing 375 gms. of IR-4B, a phenolformaldehyde anion exchange resin made by Rohm and Haas Company, Philadelphia, Pennsylvania. The effluent from this column totaled 2,000 ml. assaying 16,000 u./ml. [total $32 \times 10^6$ units]. This is an overall yield of 65.3% on an activity basis.

Example VII

Filtered broth, 500 litres (pH 3.5) assaying 140 u./ml. [total, $70 \times 10^6$ units] was passed through a column containing 1 kg. of IRC-50 resin. The effluent, assaying approximately 7 u./ml. [total, $3.5 \times 10^6$ units], was discarded. The column was washed with 4 liters of water and then eluted with 20 liters of 1 normal hydrochloric acid. The eluate was passed through a column containing 500 gms. of IR-4B resin and the column washed with 7.8 liters of water. The combined effluent and wash totaled 27.8 liters was evaporated in vacuo to 2.6 liters assaying 8,000 u./ml. [total $20.8 \times 10^6$ units]. This is an overall yield of 29.7% on an activity basis.

Example VIII

To 830 liters of filtered broth pH 3.6, assaying 118 u./ml. [total, $98 \times 10^6$ units] was added 2 kgs. of picric acid in 36 liters of boiling water. The resulting suspension was stirred 4 hours then permitted to settle for 16 hours prior to filtration. The filtrate, assaying 8 u./ml. [total, $6.6 \times 10^6$ units], was discarded. The residue on the filter, crude eulicin picrate, was extracted with 9 liters of methanol followed by a second extraction with 5 liters of methanol. The combined extracts, containing $61.7 \times 10^6$ units, were evaporated in vacuo to 3.8 liters. 32 ml. of concentrated hydrochloric acid were added and the solution stirred with 5 volumes of diethyl ether. This mixture was extracted with 1,200 ml. of water. The aqueous extract was stripped of solvent by evaporation in vacuo resulting in 2,000 ml. of an aqueous solution of crude eulicin hydrochloride assaying 28,800 u./ml. [total, $57.6 \times 10^6$ units]. The pH of this solution was adjusted to 7.0 and filtered; the pH of this filtrate was adjusted to 9.0 and filtered. The filtrate, adjusted to pH 7.0, assayed 36,000 u./ml. [total, $67 \times 10^6$ units]. This solution was passed through a column containing 200 gms. of Duolite S-30 resin. The column was washed with water. The combined effluent and wash totaled 3.5 liters assaying 14,100 u./ml. [total, $49 \times 10^6$ units]. To 2,500 ml. of this solution there was added 500 ml. of a 4% (w./v.) solution of methyl orange at 80° C., the resulting suspension was filtered; the residue of crude eulicin helianthate on the filter was washed with 500 ml. of water at 50° C. The crude eulicin helianthate after drying assayed 920 u./mg. [total, 28 gms.]. The 28 gms. of this material was dissolved in 200 ml. of 80% ethanol at 60° C. and filtered while warm. On cooling to room temperature, crystals of eulicin helianthate formed which, after filtration and drying for 2 hours at 105° C., totaled 8.5 gms. assaying 1,540 u./mg., M.P. 139–140° C.

Example IX

Crystalline eulicin helianthate, 200 mgs., obtained as described in Example VIII was dissolved in 20 ml. of methanol. The solution was cooled to 15° C., 0.25 ml. concentrated hydrochloric acid was added and the solution filtered. The solution was decolorized by filtration through a 1 mm. bed of Norit A. Acetone, 25 ml., and 250 ml. of diethyl ether were added to the filtered solution resulting in the formation of a haze. Approximately 500 mgs. of Hyflow Supercel, a filter aid made by Johns-Manville, was added to the hazy solution with stirring, and permitted to settle. The clear supernatant was decanted, the solid was dried in vacuo, followed by extraction with 20 ml. of water. The aqueous extract, after drying, yielded 2.87 mg./ml. of a white, solid eulicin hydrochloride assaying 3,480 u./mg.

Example X

Crystalline eulicin helianthate, obtained as described in Example VIII, was dissolved in the minimum amount of warm methanol. Excess concentrated sulfuric acid was added and the resulting precipitate of helianthic acid was removed by filtration. The filtrate was decolorized by passage through a washed bed of Norit A and then diluted with ether and a small amount of acetone resulting in the formation of a haze. Hyflow Supercel was added to the hazy solution with stirring and permitted to settle. The clear supernatant was decanted and the solid residue was dried in vacuo, followed by extraction with water. The aqueous extract was titrated to pH 5.5 with an aqueous solution of barium hydroxide and the precipitate of barium sulfate was removed by filtration. The filtrate was lyophilized yielding amorphous, white eulicin sulfate assaying 3,700 u./mg.

Pure, amorphous eulicin sulfate is a white material containing carbon, hydrogen, oxygen, nitrogen and sulfur (as sulfate). The free base contains carbon, hydrogen, oxygen and nitrogen.

The acid salts of eulicin, e.g. the hydrochloride and sulfate, are soluble in water, methanol and ethanol and insoluble in organic solvents such as acetone, ether and esters. The free base is water soluble. The free base and its acid salts can be salted out from solution as a liquid phase by a variety of inorganic salts such as ammonium sulfate, sodium sulfate, sodium chloride and the like.

Eulicin can be precipitated from aqueous solution by the alkali salts of high molecular weight organic acids such as sodium benzoate, sodium stearate, sodium oleate, sodium helianthate, sodium picrate, sodium flavianate, etc. The antibiotic is a strong base and its salts with mineral acids, such as hydrochloric acid and sulfuric acid, are substantially neutral in aqueous solution. These solutions are stable on storage. The antibiotic potency is not reduced by autoclaving for 1 hour at about 120° C. The solid hydrochloride and helianthate are stable to heating at about 100° C. for 4–6 hours.

Two infrared spectra of eulicin, as the sulfate salt, are given in FIGURE 1. A potassium bromide pellet was used to obtain a spectrum in addition to that obtained using a Nujol mull since the mineral oil itself absorbs in the region of 3.4–3.6μ, 6.8–7.0μ and 7.2–7.4μ and therefore covers up anything that the sample might show in these wavelengths. The Nujol mull spectrum is the uppermost curve in FIGURE 1, identified by the letter A, and the lower curve, identified by the letter B, was obtained using the potassium bromide pellet. Each curve was obtained on a Perkins-Elmer model 21 automatic recording infrared spectrophotometer with NaCl prism. The spectrum in each case was recorded automatically from 2.0 to 15μ. To obtain curve A, the sample of eulicin sulfate was mulled with heavy mineral oil and one drop was spread evenly between two salt plates without the use of a spacer. A blank of mineral oil alone was used as a reference. To obtain curve B, the sample of eulicin sulfate was mixed in the ratio of 0.3% with crystalline potassium bromide, photometric grade, pulverized together and compressed into a transparent disc having a thickness of approximately 0.020 inch and a diameter of 9/32 inch. The disc then was placed in the spectrophotometer. A compensating potassium bromide disc was used as a reference. The following are the bands believed to be significantly distinguishing: 3.05, 3.12, 3.23, 3.49, 6.06, 6.12, 6.50, 6.85, 7.35–7.40, 8.0–8.2, 8.90–8.95, 9.1–9.3 microns.

The bands at 3.12 and 6.12μ are small shoulders that are difficult to reproduce on the scale used for the drawings although they can be seen best in curve A.

Figure 2:
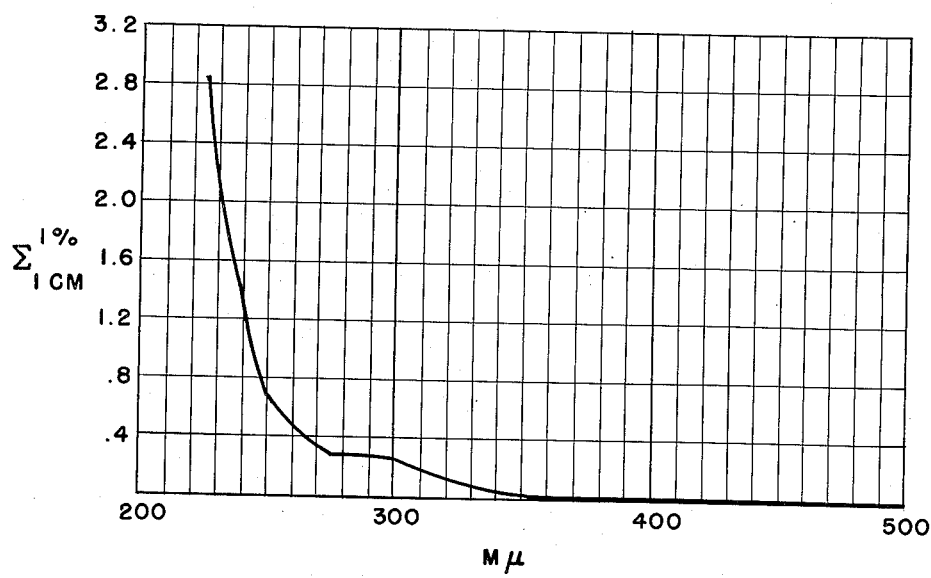

The ultraviolet spectrum of eulicin sulfate in aqueous solution, shown in FIGURE 2, has no characteristic peaks and shows only end absorption.

What is claimed is:

The fungicidal agent, eulicin, having the structure:

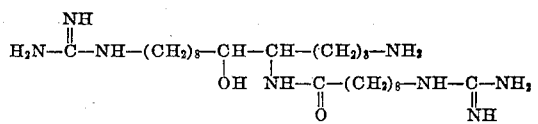

References Cited in the file of this patent

UNITED STATES PATENTS

| | | |
|---|---|---|
| 2,483,892 | Ehrlich et al. | Oct. 4, 1949 |
| 2,483,969 | Gajewski | Oct. 4, 1949 |
| 2,486,249 | Bird | Oct. 25, 1949 |
| 2,649,401 | Haines | Aug. 18, 1953 |
| 2,734,018 | Minieri et al. | Feb. 7, 1956 |

OTHER REFERENCES

Bergey's Manual of Determinative Bacteriology, sixth edition, page 939.